(12) United States Patent
Selan

(10) Patent No.: US 11,343,486 B2
(45) Date of Patent: May 24, 2022

(54) COUNTERROTATION OF DISPLAY PANELS AND/OR VIRTUAL CAMERAS IN A HMD

(71) Applicant: Valve Corporation, Bellevue, WA (US)

(72) Inventor: Jeremy Adam Selan, Kirkland, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 17/148,457

(22) Filed: Jan. 13, 2021

(65) Prior Publication Data

US 2021/0136351 A1     May 6, 2021

Related U.S. Application Data

(63) Continuation of application No. 16/366,981, filed on Mar. 27, 2019, now Pat. No. 10,904,516.

(60) Provisional application No. 62/792,290, filed on Jan. 14, 2019.

(51) Int. Cl.
| | |
|---|---|
| *H04N 13/327* | (2018.01) |
| *G06T 7/73* | (2017.01) |
| *H04N 13/378* | (2018.01) |
| *G06T 3/00* | (2006.01) |

(Continued)

(52) U.S. Cl.
CPC ......... *H04N 13/327* (2018.05); *G06T 3/0006* (2013.01); *G06T 7/73* (2017.01); *H04N 13/366* (2018.05); *H04N 13/371* (2018.05); *H04N 13/378* (2018.05); *H04N 2213/001* (2013.01)

(58) Field of Classification Search
CPC .. H04N 13/327; H04N 13/366; H04N 13/371; H04N 13/378; H04N 2213/001; G06T 3/0006; G06T 7/73; G02B 2027/0132; G02B 27/0176; G06F 3/0346
See application file for complete search history.

(56) References Cited

U.S. PATENT DOCUMENTS

| | | |
|---|---|---|
| 8,704,879 B1 | 4/2014 | Cheng et al. |
| 2004/0004584 A1 | 1/2004 | Hebert |
| 2011/0304472 A1 | 12/2011 | Chou et al. |

(Continued)

OTHER PUBLICATIONS

Non Final Office Action dated Mar. 4, 2020 for U.S. Appl. No. 16/366,981 "Counterrotation of Display Panels and/or Virtual Cameras in a HMD", Selan, 28 pages.

(Continued)

*Primary Examiner* — Brent D Castiaux
(74) *Attorney, Agent, or Firm* — Lee & Hayes, P.C.

(57) ABSTRACT

A head-mounted display (HMD) system may include a HMD with a housing and a pair of display panels, mounted within the housing, that are counterrotated in orientation. A compositor of the HMD system may also be configured to provide camera pose data with counterrotated camera orientations to an executing application (e.g., a video game application), and to resample the frames received from the application, with or without rotational adjustments in the clockwise and counterclockwise directions depending on whether the display panels of the HMD are upright-oriented or counterrotated in orientation. A combined approach may use the counterrotated camera orientations in combination with counterrotated display panels to provide a HMD with optimized display performance.

20 Claims, 9 Drawing Sheets

(51) Int. Cl.
*H04N 13/371* (2018.01)
*H04N 13/366* (2018.01)

(56) References Cited

U.S. PATENT DOCUMENTS

| | | |
|---|---|---|
| 2012/0127284 A1 | 5/2012 | Bar-Zeev et al. |
| 2013/0235169 A1 | 9/2013 | Kato et al. |
| 2015/0084850 A1* | 3/2015 | Kim .................. G02B 27/644 |
| | | 345/156 |
| 2016/0005231 A1 | 1/2016 | Yamaga |
| 2016/0035139 A1 | 2/2016 | Fuchs et al. |
| 2017/0295353 A1 | 10/2017 | Hwang et al. |
| 2018/0122042 A1* | 5/2018 | Kim .................. G06F 3/0346 |
| 2018/0364488 A1* | 12/2018 | Mori .................. G02B 27/022 |
| 2019/0333480 A1 | 10/2019 | Lang |
| 2020/0228788 A1 | 7/2020 | Selan |

OTHER PUBLICATIONS

Final Office Action dated Jul. 14, 2020 for U.S. Appl. No. 16/366,981, "Counterrotation of Display Panels and/or Virtual Cameras in a HMD", Selan, 22 pages.
Final Office Action dated Jul. 14, 2020 for U.S. Appl. No. 16/366,981, "Counterrotation of Display Panels and/or Virtual Cameras in a HMD", Selan, 17 pages.
The PCT Search Report and Written Opinion dated Apr. 27, 2020 for PCT Application No. PCT/US20/13438, 14 pages.
International Preliminary Report on Patentability for PCT/US2020/013438, dated Jul. 29, 2021, 13 pages.

\* cited by examiner

FRONT VIEW 700

TOP VIEW 702

TOP VIEW 704

# US 11,343,486 B2

1

COUNTERROTATION OF DISPLAY PANELS AND/OR VIRTUAL CAMERAS IN A HMD

CROSS REFERENCE TO RELATED APPLICATION

This patent application is a continuation of and claims priority to co-pending and co-owned U.S. patent application Ser. No. 16/366,981, filed Mar. 27, 2019, entitled "COUNTERROTATION OF DISPLAY PANELS AND/OR VIRTUAL CAMERAS IN A HMD," which claims priority to commonly assigned U.S. Provisional Patent Application Ser. No. 62/792,290, filed Jan. 14, 2019. Application Ser. Nos. 16/366,981 and 62/792,290 are each fully incorporated herein by reference.

BACKGROUND

Head-mounted displays (HMDs) can be worn by users for purposes of immersing the users in a virtual reality (VR) environment (e.g., a VR game) or an augmented reality (AR) environment. A HMD operates by displaying images on one or more display panels based on frames that are output by an application (e.g., a video game). These images are viewed by a user through the optics (e.g., lenses) that are included in the HMD, making the user perceive the images as if the user was immersed in a VR or AR environment.

Some HMDs employ a single display panel, while others employ a pair of display panels. One reason for using a single display panel is that it is cheaper to implement (from a cost of materials and/or manufacturing standpoint) than a pair of display panels. However, using two display panels provides several advantages, such as increased display bandwidth, the ability to utilize more of the available pixels, and allowing users to adjust the distance between the two display panels, among other advantages.

The HMDs on the market today all have one thing in common: they have one or more display panels in an upright panel orientation. For example, HMDs with two display panels orient the display panels directly in front of the user's face in a coplanar, side-by-side arrangement, with their respective side edges parallel to each other. This type of upright panel orientation suffers from several drawbacks. For example, panel artifacts, such as stripes or bands running the length of the panels, often manifest on the upright-oriented panels along with the displayed images. These panel artifacts are visually distracting to the viewing user. In addition, the field of view (FOV) available to the user is limited to, or by, the width of the display panels, which are typically rectangular in shape. In addition, rudimentary filters (e.g., box filters) that are used to resample upright-oriented images often introduce sampling artifacts (e.g., jagged lines) along the verticals and horizontals of the displayed images. These sampling artifacts are also quite visually distracting to the viewing user, especially when coupled with the above-mentioned panel artifacts.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

FIG. 2 also shows reference planes for describing an orientation of the display panel, relative to the upright panel orientation, after rotating or canting the display panel about one or more axes.

DETAILED DESCRIPTION

Figure 1:
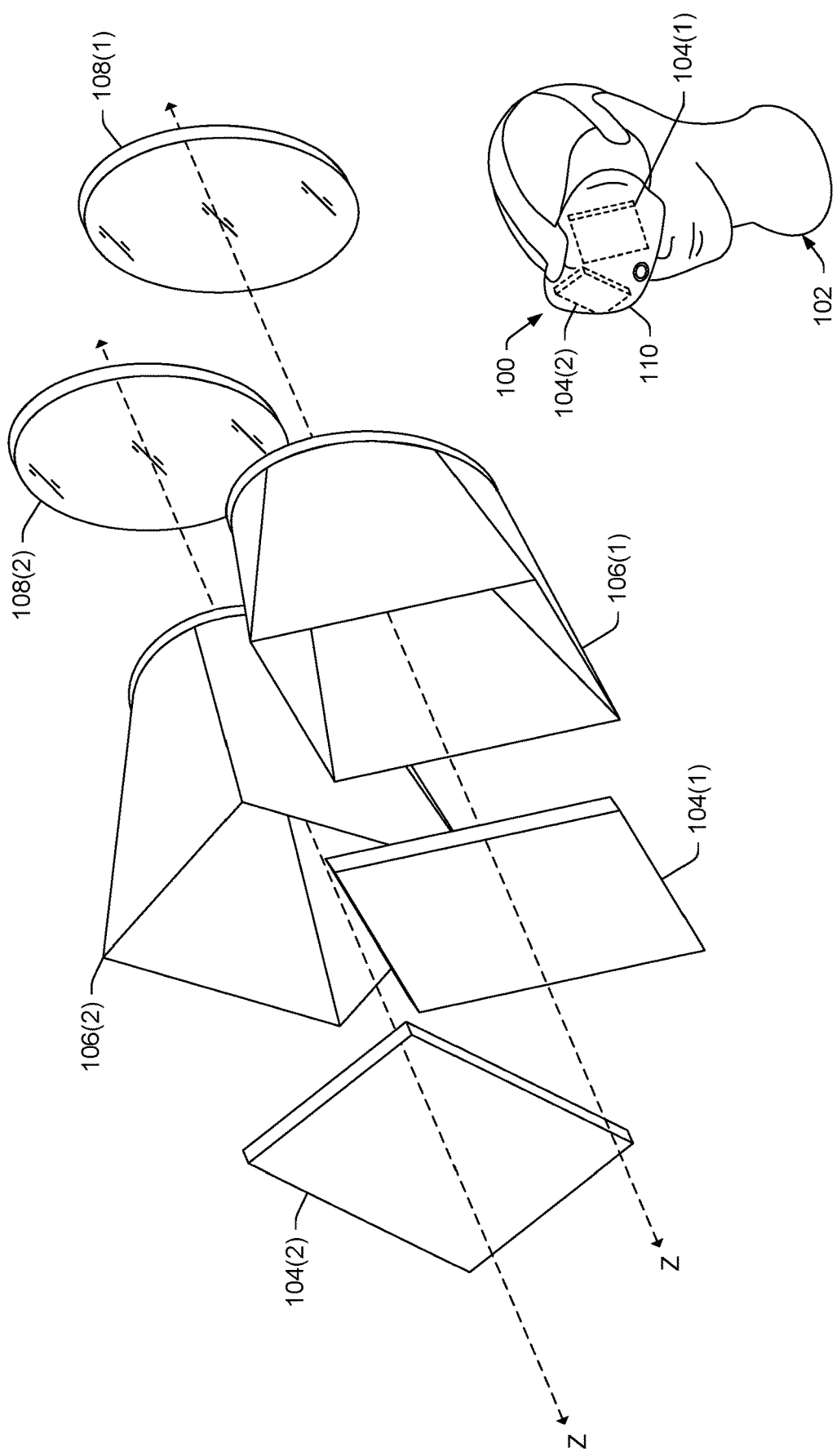
FIG. 1 is a diagram illustrating an example head-mounted display (HMD) that includes a pair of display panels that are counterrotated in orientation.

Described herein are, among other things, a head-mounted display (HMD) system that includes a HMD having a housing and a pair of display panels mounted within the housing, the display panels being counterrotated in orientation. The pair of display panels may include a first display panel (e.g., a left display panel configured to be viewed by a left eye of a user wearing the HMD) and a second display (e.g., a right display panel configured to be viewed by a right eye of the user wearing the HMD). The first display panel may be oriented in a first orientation by the first display panel being rotated, relative to an upright panel orientation, in a first (e.g., clockwise) direction about a first axis that is orthogonal to a frontal plane of the first display panel, while the second display panel may be oriented in a second orientation by the second display panel being rotated, relative to the upright panel orientation, in second (e.g., counterclockwise) direction opposite the first direction about a second axis that is orthogonal to a frontal plane of the second display panel. In a configuration where the display panels are coplanar and adjacent to each other, a side edge of the first display panel and a side edge of the second display panel are not parallel (e.g., the respective side edges of the pair of display panels form an angle between 0 and 180 degrees, exclusive).

Also described herein are techniques for providing camera pose data with counterrotated camera orientations to an executing application (e.g., a video game application), and resampling the frames received from the application, with or without rotational adjustments, depending on whether the display panels of the HMD are upright-oriented or counterrotated in orientation. For example, computer-readable instructions (e.g., a compositor) of the HMD system that are executed for resampling frames that are output by an application (e.g., a video game application) may send, to the application, a first rotated camera orientation of a first virtual camera (e.g., a left virtual camera) that is rotated in a first (e.g., counterclockwise) direction, and a second rotated camera orientation of a second virtual camera (e.g., a right virtual camera) that is rotated in a second (e.g., clockwise) direction opposite the first direction. The compositor may then receive a frame output by the application in accordance with the counterrotated camera orientations. This counterrotated camera orientation approach can be used with upright-oriented display panels of the HMD, in which case, the compositor resamples the frame by rotating first and second subsets of the pixel data of the frame in opposite directions to that of the rotated camera orientations to display a pair of upright-oriented images on the upright-oriented display panels. This means that the disclosed techniques for providing counterrotated camera orientations to the executing application may be performed independently of counterrotating the display panels of the HMD.

In some embodiments, a combined approach is implemented in a HMD system that includes a HMD with a pair of display panels counterrotated in orientation, whereby the compositor provides camera pose data with counterrotated camera orientations to an executing application (e.g., a video game application), and the compositor resamples the frame received from the application without making rotational adjustments based on the camera pose data or based on the orientations of the display panels. In this manner, upright-oriented images are displayed on the counterrotated display panels without having to perform rotational adjustments (based on the camera pose data or the orientations of the display panels) in the resampling step. This combined approach provides several benefits, many related to improving the display performance of the HMD. For example, counterrotating the display panels of the HMD mitigates panel artifacts, such as stripes or bands running the length of the panel in the verticals and horizontals of the panel, by camouflaging the panel artifacts. That is, the panel artifacts that manifest on the individual display panels still exist, but because the display panels are rotated, they are no longer visible to both eyes of the user at the same locations on the display. As a consequence, the panel artifacts are made inconspicuous to the viewing user so that they are no longer visually distracting. Counterrotated display panels also offer a wider field of view (FOV) to the viewing user, as compared to upright-oriented display panels, and they also allow for decreasing the depth dimension of the HMD by enabling the manufacturer of the HMD (and/or the user) to move the display panels closer to the user's face, which can provide a more ergonomic HMD that is smaller, lighter in weight, and more comfortable to wear. Moreover, in embodiments where the compositor of the HMD is programmed to send camera pose data with counterrotated camera orientations to an executing application, sampling artifacts (e.g., jagged lines) are also mitigated. This is because the filters (e.g., box filters) that are used to resample counterrotated images no longer cause the sampling artifacts that they would otherwise cause if upright-oriented images were to be resampled using the same filters, thereby providing smoother-looking lines in the displayed images.

It is to be appreciated that this disclosure describes systems (e.g., a HMD system) configured to implement the techniques and processes disclosed herein. In some embodiments, the HMD includes a pair of display panels that are counterrotated in orientation. In other embodiments, the HMD may include upright-oriented display panels, in which case counterrotated camera orientations are provided to an executing application by the compositor of the HMD in the process of rendering frames. Also disclosed herein are non-transitory computer-readable media storing computer-executable instructions to implement the techniques and processes disclosed herein. Although many of the examples below are described in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example head-mounted display (HMD) 100, while being worn by a user 102. The HMD 100 in the example of FIG. 1 is shown as including a pair of display panels 104(1) and 104(2) that are counterrotated in orientation. Each a display panel 104, a lens tube 106, and a lens 108 make up a lens-and-display assembly. As such, the HMD 100 may include a pair of lens-and-display assemblies including a first lens-and-display assembly comprised of a first display 104(1), a first lens tube 106(1), and a first lens 108(1), and a second lens-and-display assembly comprised of a second display 104(2), a second lens tube 106(2), and a second lens 108(2). The first lens-and-display assembly may correspond to the user's 102 left eye, while the second lens-and-display assembly may correspond to the user's 102 right eye. Each lens-and-display assembly is aligned on its own primary optical axis, labeled as the Z-axes in FIG. 1. Each Z-axis (associated with each lens-and-display assembly) is orthogonal to a frontal plane of the display panel 104. Reference planes, such as the aforementioned frontal plane, are discussed in more detail below with reference to FIG. 2.

The pair of lens-and-display assemblies shown in FIG. 1 may be mounted within a housing 110 of the HMD 100. An outer shell of the housing 110 is shown in FIG. 1, but it is to be appreciated that the housing 110 may include various components and/or structures that are used to mount various electronic components and printed circuit boards within the housing 110. The pair of display panels 104(1) and 104(2) (collectively 104) and the pair of lenses 108(1) and 108(2) (collectively 108) may be mounted to opposite ends of the lens tubes 106(1) and 106(2) (collectively 106), respectively, using any suitable attachment mechanism (e.g., screws, adhesive, latches, pins, etc.). Furthermore, the lens-and-display assemblies may be mounted to a midframe within the housing 110 that abuts the back surface of the display panels 104. This midframe can house other components of the HMD, such as a motherboard with various sensors, processors, etc. The housing 110 may further include a shrouded (or hooded) midframe that attaches to the lens-and-display assemblies with apertures for the lenses 108. This shrouded midframe may be configured to blocks ambient light from entering the space between the user's eyes and the lenses 108(1) and 108(2) (collectively 108) when the user 102 is wearing the HMD 100.

In general, the HMD 100 may be worn by the user 102 for purposes of immersing the user in a virtual reality (VR) environment (e.g., a VR game) and/or an augmented reality (AR) environment. Accordingly, the HMD 100 may, in some examples, represent a VR headset for use in VR systems, such as for use with a VR gaming system. However, the HMD 100 may additionally, or alternatively, be implemented as an AR headset for use in AR applications. In AR, a user 102 sees virtual objects overlaid on a real-world environment, whereas, in VR, the user 102 does not see a real-world environment, but is fully immersed in a virtual environment, as perceived via the display panels 104 and the optics (e.g., lenses 108) of the HMD 100. Examples described herein pertain primarily to a VR-based HMD 100, but it is to be appreciated that the HMD 100 is not limited to implementations in VR applications.

The pair of display panels 104 are configured to display images based on a series of image frames (herein referred to as "frames") that are output by an application (e.g., a video game). These images are viewed by the user 102 through the lenses 108, which may include various types of optics to provide a near-to-eye display. In this manner, the user 102 perceives the images as if the user 102 was immersed in a VR or AR environment. A compositor of the HMD 100 may utilize various techniques to resample the frames that are output by the application, such as performing chromatic distortion, re-projection, and so on. In some embodiments, the compositor may resample the frames by counterrotating subsets of pixel data of the individual frames (in clockwise and counterclockwise directions, respectively) to ensure that images are displayed in an upright-orientation on the display panels 104, as will be described in more detail below. Regardless of whether the resampling step includes rotational adjustments based on the camera pose data and/or the orientations of the display panels, the modified pixel data of the resampled frames may be output to a frame buffer for displaying images on the display panels 104. For instance, the frame buffer used by the HMD 100 may be a stereo frame buffer that renders a pair of images on the pair of display panels. For example, pixel data for 2160×1200 pixels can be output to the frame buffer for display on the pair of display panels 104 of the HMD 100 (e.g., 1080×1200 pixels per display panel 104).

The display panels 104 may utilize any suitable type of display technology, such as an emissive display that utilizes light emitting elements to emit light during presentation of frames on the display panel(s) 104 of the HMD 100. As an example, the display panels 104 of the HMD 100 may comprise liquid crystal displays (LCDs), organic light emitting diode (OLED) displays, inorganic light emitting diode (ILED) displays, or any other suitable type of display that utilizes a suitable display technology used for HMD 100 applications. In some embodiments, the display system of the HMD 100 may be a low-persistence display system, meaning that the light emitting elements emit light for a small fraction of a frame time (e.g., roughly 1 millisecond (ms) out of a frame time of 11.11 ms) for each frame that is used to render an image on the display panels.

Figure 2:
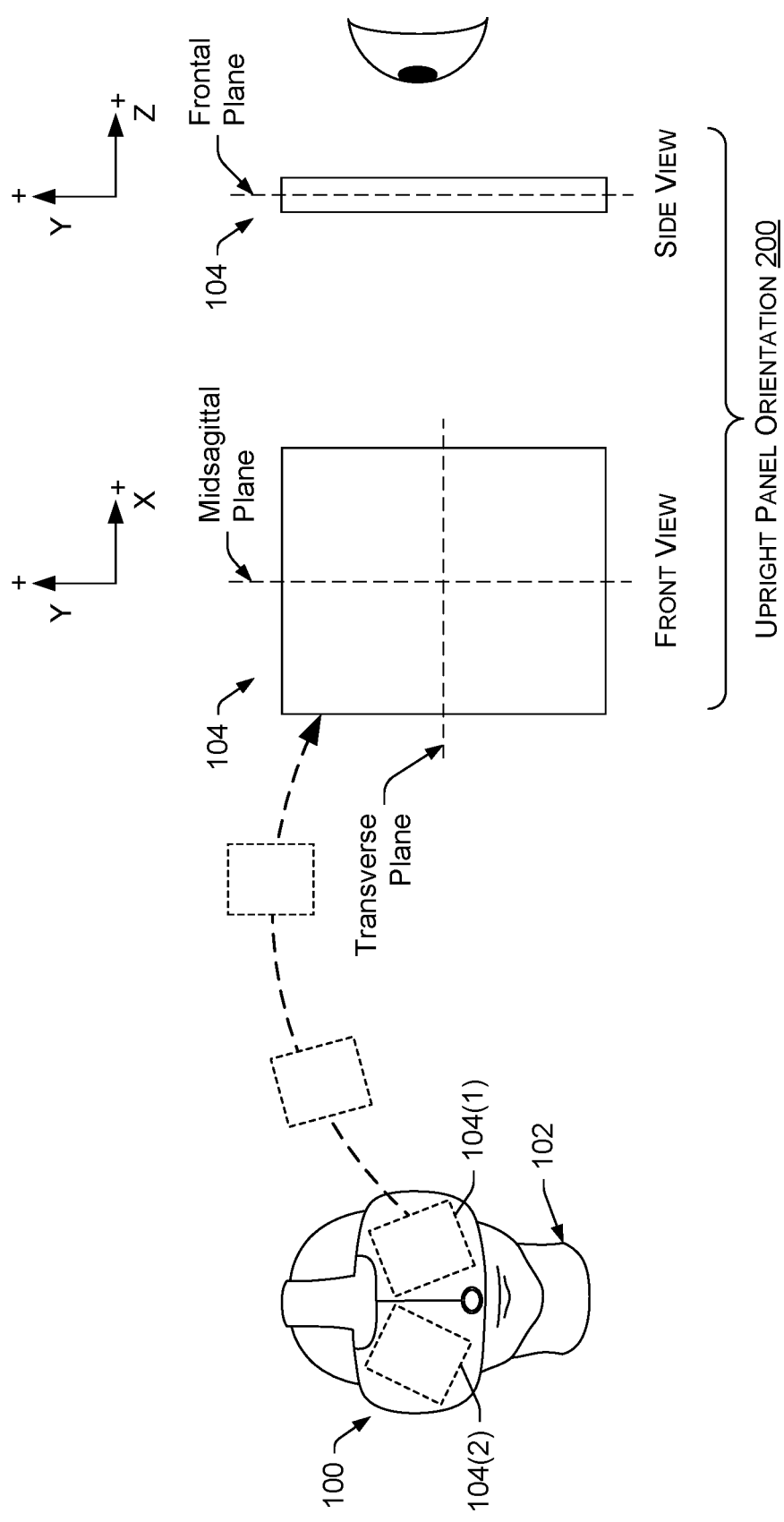
FIG. 2 is a diagram illustrating a front view and a side view of a display panel (one of the display panels in the HMD) in an upright panel orientation.

FIG. 2 is a diagram illustrating a front view and a side view of a display panel 104 in an upright panel orientation 200. The panel 104 in FIG. 2 may represent either one of the display panels 104(1) or 104(2), but with the upright panel orientation 200. FIG. 2 also shows three reference planes—a frontal plane, a midsagittal plane, and a transverse plane—which are referenced herein to describe how each display panel 104 can be rotated and/or canted into a particular orientation within the housing 110 of the HMD 100.

As shown in FIG. 2, the frontal plane of the display panel 104 is parallel to a front and back surface of the display panel 104. The front surface of the display panel 104 is the surface of the display panel 104 that a user 102 looks at during image presentation. The frontal plane can bisect the display panel 104 into a front half and a back half, the front half having the front (viewing) surface of the display panel 104. Furthermore, an axis that is orthogonal to the frontal plane of the display panel 104 is labeled as the Z-axis in FIG. 2. This Z-axis can, in some configurations, correspond to a primary optical axis along which light travels from the display panel 104 to the user's 102 eye. Although positive and negative directions can be defined in any manner, the examples herein are described with reference to a positive Z-direction that is pointing from the display panel 104 towards the user 102 wearing the HMD 100. Accordingly, the negative Z-direction is considered to be in a direction pointing from the user 102 wearing the HMD 100 towards the display panel 104.

The midsagittal plane bisects the display panel 104 in the vertical direction to create a left half and a right half. An axis that is orthogonal to a midsagittal plane of the display panel 104 is labeled as the X-axis in FIG. 2. Again, although positive and negative directions can be defined in any manner, the examples herein are described with reference to a positive X-direction that is pointing from the left half of the display panel 104 towards the right half of the display panel 104 (from the perspective of the user 102 looking at the front surface of the display panel 104). Accordingly, the negative X-direction is considered to be in a direction pointing from the right half of the display panel 104 towards the left half of the display panel 104 (again, from the perspective of the user 102 looking at the front surface of the display panel 104).

The transverse plane bisects the display panel 104 in the horizontal direction to create a top half and a bottom half. An axis that is orthogonal to a transverse plane of the display panel 104 is labeled as the Y-axis in FIG. 2. Again, although positive and negative directions can be defined in any manner, the examples herein are described with reference to a positive Y-direction that is pointing from the bottom half of the display panel 104 towards the top half of the display panel 104. Accordingly, the negative Y-direction is considered to be in a direction pointing from the top half of the display panel 104 towards the bottom half of the display panel 104.

Figure 3:
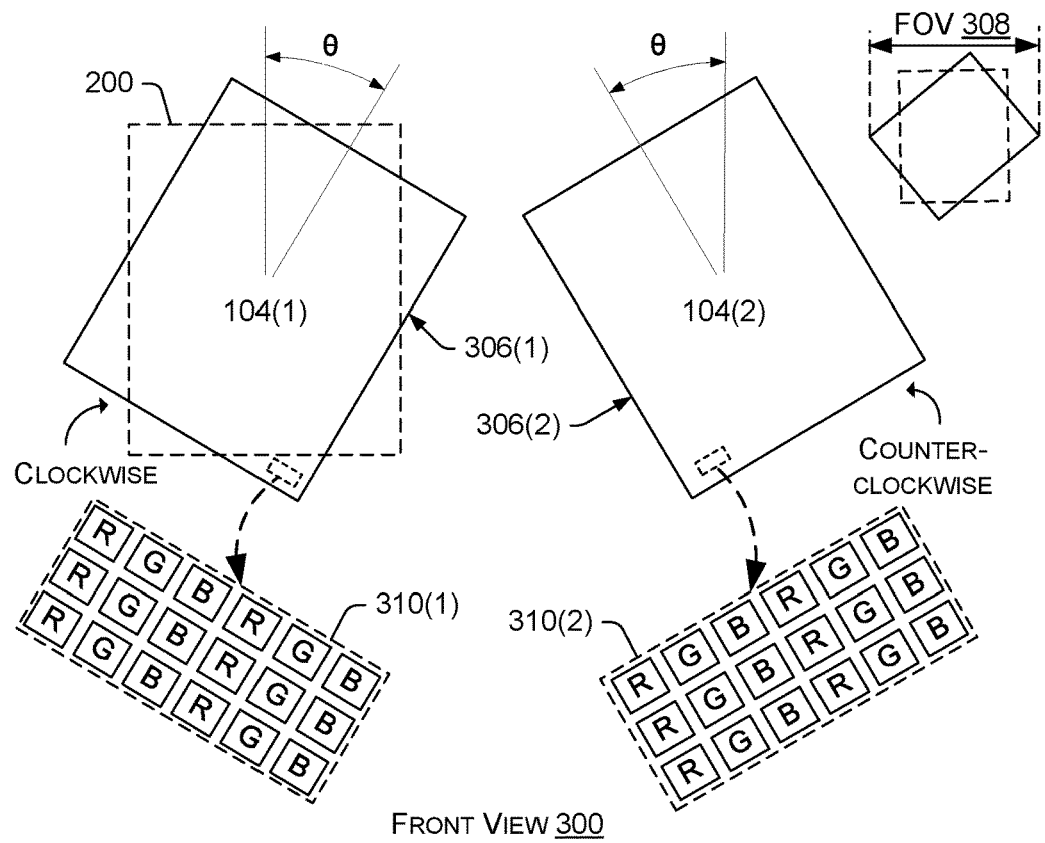
FIG. 3 is a diagram illustrating a front view of a pair of display panels counterrotated in orientation, a top view of the pair of the display panels counterrotated in orientation, and an additional top view of the pair of display panels after canting the display panels.
Figure 3:
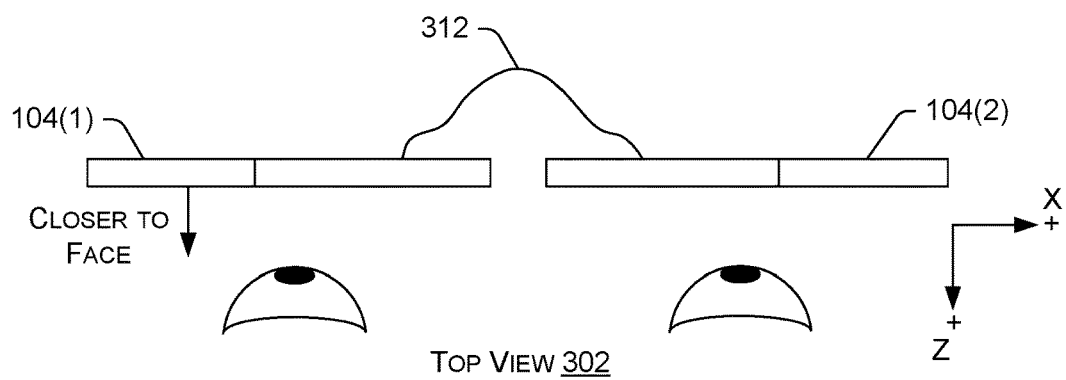
Figure 3:
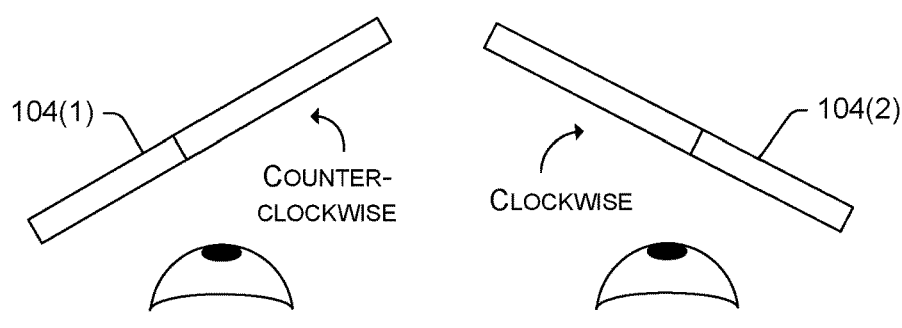

FIG. 3 is a diagram illustrating a front view 300 of a pair of display panels 104(1) and 104(2) that are counterrotated in orientation, as well as a top view 302 of the pair of display panels 104(1) and 104(2) counterrotated in orientation, and an additional top view 304 of the pair of display panels 104(1) and 104(2) after canting the display panels 104(1) and 104(2) in opposite directions.

The front view 300 represents a view of the front surfaces of the display panels 104(1) and 104(2), the front surfaces being the surfaces on which images are presented via an array of pixels on each display panel 104. Thus, the first display panel 104(1) may represent a left display panel corresponding to the user's 102 left eye, and the second display panel 104(2) may represent a right display panel corresponding to the user's 102 right eye. As shown in FIG. 3, the first display panel 104(1) is oriented in a first orientation by the first display panel 104(1) being rotated, relative to the upright panel orientation 200, in a first direction (e.g., a clockwise direction) about a first axis (e.g., the Z-axis) that is orthogonal to a frontal plane of the first display panel 104(1). Meanwhile, the second display panel 104(2) is oriented in a second orientation by the second display panel 104(2) being rotated, relative to the upright panel orientation 200, in a second direction (e.g., a counterclockwise direction) opposite the first direction about a second axis (e.g., the Z-axis) that is orthogonal to a frontal plane of the second display panel 104(2). Thus, the pair of display panels 104 are counterrotated in orientation because they are each rotated about their respective Z-axes in opposite directions relative to each other.

In some embodiments, the second display panel 104(2) is adjacent to the first display panel 104(1), and vice versa, and the two display panels 104(1) and 104(2) are coplanar. The spacing between the display panels 104 is configurable and may be based on heuristics associated with interpupillary distances (IPDs) of users. In some embodiments, the innermost points (e.g., adjacent top corners) of the two display panels 104 may be touching (i.e., in contact), or they may be separated by a small gap, such as a distance of about 1-3 millimeters (mm). In some embodiments, the display panels 104(1) and 104(2) may be disparately located with respect to each other. For instance, instead of positioning the display panels 104(1) and 104(2) directly in front of the user's 102 eyes, the display panels 104 may be located elsewhere in the HMD (e.g., near the user's 102 temples, directly in front of the user's 102 forehead, etc., and optical components, such as waveguides, mirrors, etc., may be used to transmit the images output on the display panels 104 to the user's 102 eyes, via the lenses 108. Even in these embodiments where the display panels 104(1) and 104(2) are not adjacent to each other in the HMD 100, the display panels 104(1) and 104(2) may still be counterrotated by rotating the first display panel 104(1) in a first direction about an axis orthogonal to its frontal plane, and by rotating the second display panel 104(2) in a second direction opposite the first direction about an axis orthogonal to its frontal plane.

The position and the orientation of the display panels 104 within the housing 110 of the HMD may be fixed (i.e., not adjustable), which may allow for calibrating the HMD 100 at the manufacturer so that a calibrated HMD 100 is provided "out-of-the-box." However, the housing 110 of the HMD 100 may include one or more mechanisms to allow a user to adjust the position and/or the orientation of each display panel 104 individually, or relative to each other, within the housing 110. For example, a threaded rod may connect the pair of lens-and-display assemblies shown in FIG. 1 together, and the HMD 100 may include a knob, or a similar adjustment mechanism, that a user 102 can manipulate to rotate the threaded rod, causing the distance between the pair of display panels 104 to increase or decrease, depending on which direction the user 102 rotates the knob. Similar mechanisms may be used to adjust the vertical positions of the display panels 104 (e.g., moving the display panels 104 up or down along the Y-axis), or to adjust the amount of rotation (e.g., about the Z-axis), and/or to adjust the amount by which the display panels 104 are canted (e.g., about the X-axis and/or the Y-axis). While this may provide added flexibility to the user 102 to adjust the position and/or orientation of the display panels 104, it may create some added difficulties in maintaining the HMD 100 in a calibrated state.

The front view 300 of FIG. 3 also shows a configuration where the display panels 104 are adjacent to each other and coplanar such that a side edge 306(1) of the first display panel 104(1) and a side edge 306(2) of the second display panel 104(2) are not parallel. This can be contrasted with a pair of display panels 104 that are oriented in the upright orientation 200 because the side edges 306(1) and 306(2) would be parallel if the pair of display panels 104 were each oriented in the upright orientation 200. With counterrotated display panels 104, an angle within the range of 0 and 180 degrees (exclusive) is formed between the side edges 306(1) and 306(2) of the pair of display panels 104(1) and 104(2).

The front view 300 of FIG. 3 also shows that the first display panel 104(1) and the second display panel 104(2) are each rotated by a substantially equal amount of rotation, θ. Rotating each panel by different amounts of rotation may cause additional problems that degrade the viewing experience of the user. As such, each panel 104 is to be rotated by a substantially equal amount of rotation, θ. A "substantially equal amount of rotation," as used herein, means within two degrees. Thus, if the first display panel 104(1) is rotated 45 degrees, and if the second display panel 104(2) is rotated 44 degrees, they are considered, herein, to be rotated by a substantially equal amount of rotation.

The amount of rotation, θ, by which each panel 104 is rotated may be within a range of 10 to 80 degrees, relative to the upright panel orientation 200. Amounts of rotation outside of this range may lessen the extent to which the benefits of a counterrotated panel orientation are perceived by the user 102. In other words, the visually-distracting defects that manifest in an axis-aligned manner (e.g., along the verticals and horizontals of the display panel) may remain noticeable to the user 102 if the display panels are rotated by an insignificant amount (e.g., less than 10 degrees) or too much (e.g., between 80 and 90 degrees). In some embodiments, for a pair of display panels 104 that are counterrotated in orientation, the amount of rotation, θ, that each display panel 104 is rotated may be within a range of 20 to 70 degrees, within a range of 30 to 60 degrees, or within a range of 40 to 50 degrees, relative to the upright panel orientation 200. In some embodiments, the display panels 104 may be counterrotated, relative to the upright panel orientation 200, by an amount of rotation, θ, that is equal to 45 degrees. A 45-degree rotation may provide the widest FOV 308, as shown in the front view 300 of FIG. 3, as well as the greatest mitigation of panel artifacts, depending on the pixel layout/pattern of the display panels 104. A common pixel pattern is a pattern where the pixels are arranged in vertical columns and horizontal rows on the display panel. With this type of pixel pattern, a 45-degree rotation may provide the greatest mitigation of panel artifacts. However, other pixel patterns are considered, which do not have the pixels arranged in vertical columns and horizontal rows. For these other types of pixel patterns, different amounts of rotation, θ, may optimally mitigate the panel artifacts. Furthermore, an amount of rotation less between 10 and 45 degrees may be optimal for following the contour of the user's 102 nose 312, which may allow for optimized ergonomic benefits (e.g., moving the display panels 104 as close as possible to the user's 102 face.

The various benefits that are realized from orienting the display panels 104 in a counterrotated panel orientation are now described. One benefit is an increased (e.g., wider) FOV 308. This increased FOV 308 can be provided to the viewing user "for free" because pixels that are not utilized in existing HMDs 100 with display panels oriented in the upright panel orientation 200 can be utilized when the display panels 104 when they are counterrotated in orientation, as shown in FIG. 3. For example, pixels located in the corners of the display panels may not be utilized when the display panels are orientated in an upright panel orientation 200 due to the reverse pincushion distortion caused by lenses, and due to the HMD "cutting off" the corners and not utilizing the pixels in the corners to provide the user with a more aesthetically-pleasing profile of the images. The front view 300 of FIG. 3 illustrates how the FOV 308 may be increased to a maximum in the horizontal dimension for rectangular-shaped display panels 104, when those display panels 104 are rotated by an amount of rotation, θ, that is equal to 45 degrees, relative to the upright panel orientation 200. An increased FOV 308 in the horizontal dimension (i.e., the positive and negative X-direction with reference to the upright panel orientation 200) may actually provide a more realistic feeling to a viewing user 102 who, in the real world, is able to see with fairly wide-ranging FOV using peripheral vision.

Another of the benefits realized by orienting the display panels 104 in a counterrotated panel orientation is the mitigation of panel artifacts (e.g., stripes or bands running the length of the panel) by camouflaging them so that they are no longer visually distracting. To explain, display panels often include defects called panel artifacts, and these panel artifacts often occur in axis-aligned manners (i.e., correlated to horizontals or verticals on the display panel). At least one type of panel artifact—bright and dark stripes or bands vertically running the length of the display—is caused by a display driving scheme called "inversion," which drives the display, frame-by-frame, using an alternating positive and negative voltage waveform. Although the positive voltage and the negative voltage are meant to be applied with an equal amount of voltage, they are typically applied with different voltages in practice. This difference in voltage between the positive and negative cycles of the alternating voltage waveform causes flickering output per column of pixels, every frame, as images are displayed on the display panel. This is visually perceived by a viewing user as vertical stripes (e.g., bright and dark stripes, interleaved), which are unrelated to the content that is being displayed in the images. These stripes are visually distracting to the viewing user. In HMDs, this visual distraction is even more conspicuous due to the unique manner in which the users head and eyes are counterrotating while using the HMD. Moreover, with upright-oriented display panels, both eyes see the bright and dark stripes in the same locations on the displays across frames, causing a visual distraction for the user.

Another example panel artifact is caused by the vertical alignment of red, green, and blue pixels, which manifests with upright-oriented display panels as colored bands of reds, greens, and blues running the length of the upright oriented display panels, which are seen by both eyes at the same locations. This can become noticeable when the user 102 is moving his/her head at a precise rate of rotation.

By orienting the display panels 104 in the counterrotated panel orientation, the above-mentioned panel artifacts are mitigated. FIG. 3 shows a first group of pixels 310(1) on the first display panel 104(1) and a second group of pixels 310(2) on the second display panel 104(2), as oriented when the panels 104 are in the counterrotated panel orientation. This counterrotated panel orientation causes the above-mentioned panel defects to be seen differently in each eye, which actually camouflages the panel defects, causing them to go unnoticed by the viewing user 102. This is because the groups of pixels 310(1) and 310(2) are no longer aligned in each eye due to their counterrotated orientation, which means that each eye sees a different defect in terms of their respective locations within the scene that is imaged on the counterrotated display panels 104, and the user 102 no longer perceives the panel defects in the scene as a consequence. It is recognized that a purely random distribution of red, green, and blue pixels may be optimal for an optimized mitigation of panel defects, but a purely random distribution may be impracticable and/or cost prohibitive. The counterrotated panel orientation is sufficient to cause the pixels to be misaligned, thereby preventing stereo fusion where both eyes see the same pixel defects, located at the same locations on both panels 104, at the same time. Even if some defects align themselves in both of the counterrotated display panels 104 across sequential frames, these defects manifest at the per-pixel level, and they go unnoticed by the user 102 wearing the HMD 100 due to the counterrotated panel orientation. Accordingly, the counterrotated panel orientation shown in FIG. 3 causes the aforementioned panel defects to be misaligned in terms of the vertical and horizontal direction of the user's 102 FOV, and the user 102 does not see the same panel defects in both eyes as a consequence, which means that the user's 102 vision no longer "snags" on the panel defects, and they remain inconspicuous.

Another benefit realized by orienting the display panels 104 in a counterrotated panel orientation is improved ergonomics. This can be seen in the top view 302 of FIG. 3 where the users 102 nose 312 is able to pass through the frontal plane of each of the coplanar display panels 104. With upright-oriented display panels, there is often insufficient space provided between the display panels, which means that the display panels cannot be brought closer to the user's face past the point where they conflict with the user's nose 312. By orienting the display panels 104 in a counterrotated orientation, sufficient space for the user's 102 nose 312 is provided between the display panels 104, and the display panels 104 can thereafter be moved closer to the user's 102 face. This means that the depth of the HMD 100 can be further reduced, as compared to existing HMDs with upright-orientated display panels directly in front of the user's 102 eyes. A smaller, lighter, and closer fitting HMD 100 improves the ergonomics of the HMD 100 by making the HMD 100 more comfortable to wear for longer periods of time, and/or usable by young users (e.g., children) who may be more sensitive to heavier/bulkier HMDs 100.

The additional top view 304 of FIG. 3 shows yet another orientation of the display panels 104(1) and 104(2) that can be provided by canting each display panel 104 about an axis (e.g., the Y-axis) that is orthogonal to the transverse plane of the upright panel orientation 200. For example, the first display panel 104(1) can be canted in a first direction (e.g., a counterclockwise direction) about the orthogonal axis to the transverse plane, and the second display panel 104(2) can be canted in a second direction (e.g., a clockwise direction) opposite the first direction about the orthogonal axis to the transverse plane. In addition, or alternatively, the display panels 104 may be canted about a second axis (e.g., the X-axis) that is orthogonal to the midsagittal plane of the upright panel orientation 200.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
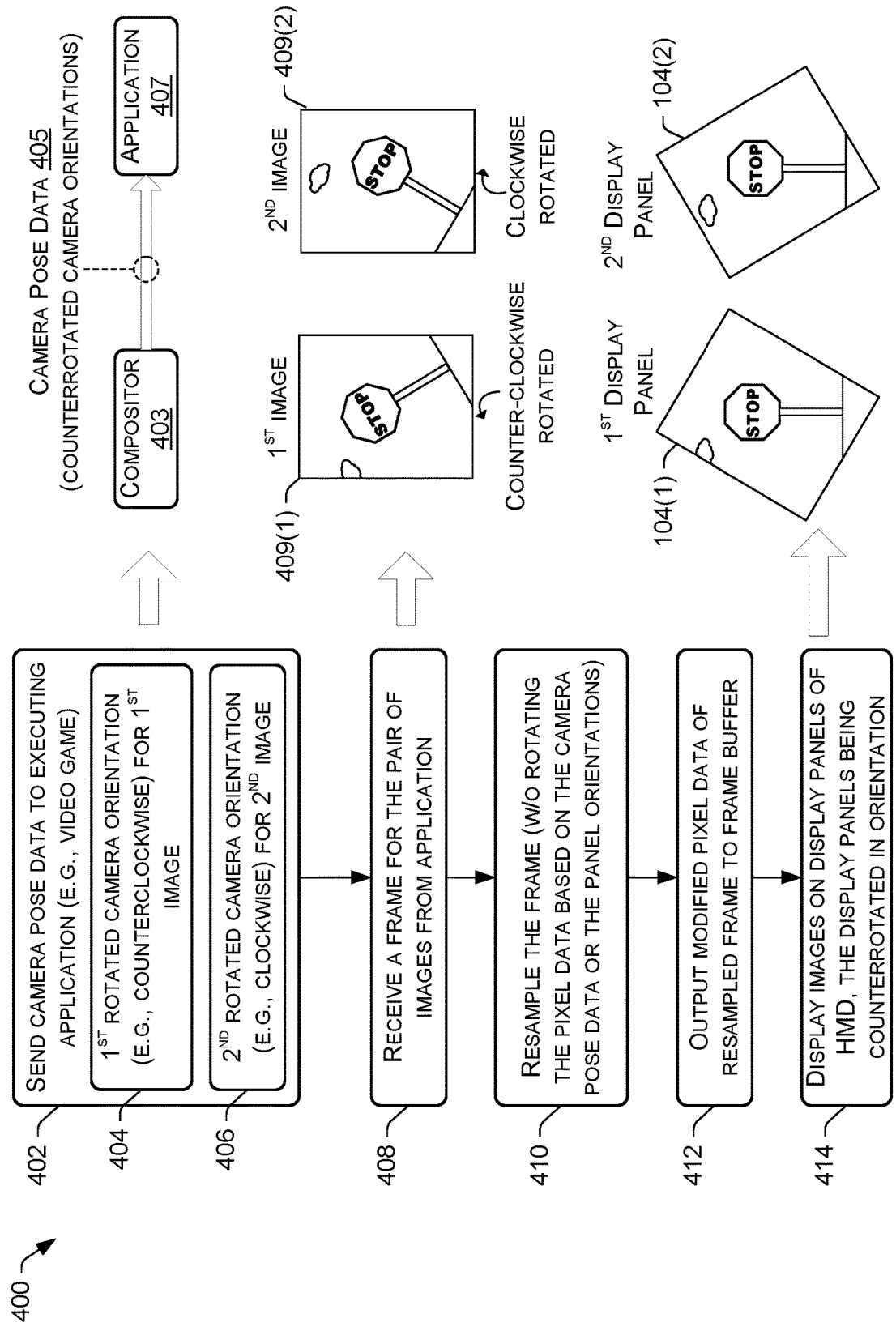
FIG. 4 is a flow diagram of an example process for sending camera pose data with counterrotated camera orientations to an executing application, resampling a frame output by the application without rotational adjustments based on the camera pose data or the orientation of the display panels, and outputting pixel data for the resampled frame to a frame buffer for display on counterrotated display panels.

FIG. 4 is a flow diagram of an example process 400 for sending camera pose data with counterrotated camera orientations to an executing application, resampling a frame output by the application without rotational adjustments based on the camera pose data or the orientations of the display panels, and outputting pixel data for the resampled frame to a frame buffer for display on counterrotated display panels. For discussion purposes, the process 400 is described with reference to the previous figures.

FIG. 4 shows an application 407, which may represent a video game application, or any other type of graphics-based application. The application 407 may execute on a computing device—such as the HMD 100 itself, or a computing device (e.g., a personal computer (PC), game console, etc.) associated with, and coupled to, the HMD 100 as part of a HMD system. As such, the application 407 may be configured to output a series of frames that are resampled by a compositor 403 of the HMD 100 (or HMD system), and ultimately displayed as images on the display panel(s) 104 of the HMD 100. Before rendering frames, the application 407 may receive various types of data from the compositor 403. At least one type of data that the compositor 403 sends to the application 407 for use by the application 407 in rendering frames is camera pose data 405, which includes a set of poses, including position and orientation, of a pair of virtual cameras. In order to provide rotated and/or canted camera orientations to the application 407, the application 407 may, in some embodiments, inform the compositor 403 of its capabilities (e.g., indicating that it is capable of receiving more complex camera orientations other than upright camera orientations that are not canted). The graphics logic of the HMD 100 may be asynchronous, or synchronous. In an asynchronous system, the compositor 403 runs separate (on a separate, asynchronous thread) from the application 407 on a graphics processing unit(s) (GPU(s)) of the HMD 100 (or HMD system).

At 402, the compositor 403 of the HMD 100 (or HMD system) may send camera pose data 405 to an executing application 407 that is configured to output a frame of pixel data. A first subset of this pixel data is associated with the first display panel 104(1), a first image, a first virtual camera, and/or a first eye of the user wearing the HMD 100, while a second subset of this pixel data is associated with the second display panel 104(2), a second image, a second virtual camera, and/or a second eye of the user wearing the HMD 100. The camera pose data 405 informs the application 407 regarding how to render a next frame, in a series of frames, in accordance with the camera pose data 405. The operation(s) at block 402 may be performed as part of an application programming interface (API) call.

As shown by sub-block 404, the camera pose data 405 may include a first rotated camera orientation associated with a first image for the frame that is to be rendered on the first display panel 104(1), and this first rotated camera orientation specifies (or indicates) that a first virtual camera, of the pair of virtual cameras, is rotated, relative to an upright camera orientation, in a first direction (e.g., a counterclockwise direction). The amount and direction of rotation specified in the first rotated camera orientation may be based on the amount and direction of rotation of the first display panel 104(1) in terms of its rotated panel orientation. That is, if the first display panel 104(1) is rotated clockwise by 45 degrees, relative to the upright panel orientation 200, the first rotated camera orientation may indicate that a first virtual camera is rotated counterclockwise by 45 degrees, relative to the upright camera orientation. The first rotated camera orientation may further specify (or indicate) that the first virtual camera is canted, if the first display panel 104(1) happens to be canted in orientation, as described herein.

As shown by sub-block 406, the camera pose data 405 may further include a second rotated camera orientation associated with a second image for the frame that is to be rendered on the second display panel 104(2), and this second rotated camera orientation specifies (or indicates) that a second virtual camera, of the pair of virtual cameras, is rotated, relative to the upright camera orientation, in a second direction (e.g., a clockwise direction) opposite the first direction. The amount and direction of rotation specified in the second rotated camera orientation may be based on the amount and direction of rotation of the second display panel 104(2) in terms of its rotated panel orientation. That is, if the second display panel 104(2) is rotated counterclockwise by 45 degrees, relative to the upright panel orientation 200, the second rotated camera orientation may indicate that a second virtual camera is rotated clockwise by 45 degrees, relative to the upright camera orientation. The second rotated camera orientation may further specify (or indicate) that the second virtual camera is canted, if the second display panel 104(2) happens to be canted in orientation, as described herein.

At 408, the compositor 403 may receive, from the application 407, a frame that includes a first image 409(1) (e.g., a left image) and a second image 409(2) (e.g., a right image). It is to be appreciated that these images 409(1) and 409(2) (collectively 409) may be received, from the application 407 and by the compositor 403, as pixel data. Pixel data for each image 409 may, in some embodiments, include a two-dimensional array of per-pixel values (e.g., color values). In some embodiments, the pixel data further includes additional data or metadata, such as depth values. In some embodiments, pixel data may include data for each pixel that is represented by a single set of color and alpha values (e.g., one color value for a red channel, one color value for a green channel, one color value for a blue channel, and one or more values for one or more alpha channels. As shown in FIG. 4, the pair of images 409 have been rendered by the application 407 in accordance with the camera pose data 405, which included the counterrotated camera orientations. As such, the scenes in the pair of images 409 are counterrotated by a corresponding amount of rotation, based on the counterrotated camera orientations. Said another way, the application 407 natively renders the counterrotated camera orientations of the virtual cameras.

At 410, the compositor 403 may resample the frame without any rotational adjustments based on the camera pose data or the orientations of the display panels. Resampling may involve applying one or more digital transformations to the pixel data of the frame output by the application 407 in order to modify/tweak/correct the application-rendered frame before it is output to the frame buffer for presentation on the display panels 104. For example, the compositor 403 may resample the frame to obtain a resampled frame by modifying the pixel data of the frame 409(1) to obtain modified pixel data of the resampled frame. Notably, this modification of the frame's pixel data at block 410 does not involve rotational adjustments of the pixel data based on the camera pose data 405 or the orientations of the display panels 104. For instance, the resampling operation(s) at block 410 may include, without limitation, a correction for lens distortion (e.g., chromatic distortion), applying re-projection transforms to modify the pixel data in accordance with a predicted head pose of the user 102, and/or other mathematical operations that modify the pixel data to create a resampled frame that is improved, or otherwise corrected, from a visual perspective. Although re-projection may involve rotational transforms that effectively rotate the frame about a reference axis, these rotational transforms are based on the predicted head pose of the user 102 in re-projection, and are not based on the camera pose data 405 pertaining to the virtual cameras or the rotation, relative to upright, of the display panels 104. By not performing rotational adjustments based on the camera pose data 405 or the orientations of the display panels 104 at block 410, the rendering pipeline is made more efficient, as compared to other embodiments described herein that involve rotational adjustments (in the clockwise/counterclockwise directions) in the resampling step.

At 412, the compositor 403 may output the modified pixel data associated with the resampled frame to a frame buffer so that the resampled frame can be output as a pair of images on the counterrotated display panels 104(1) and 104(2) of the HMD 100.

At 414, a pair of images based on the resampled frame may be displayed on the counterrotated display panels 104(1) and 104(2) of the HMD 100. As shown in FIG. 4, the images presented on the display panels 104 are in an upright orientation despite the counterrotated orientation of the display panels 104. This is due to the counterrotated camera orientations that are provided in the camera pose data 405 to the application 407. It is to be appreciated that the process 400 involves rendering a single frame, and that the process 400 may iterate to render multiple sequential frames during execution of the application 407.

An example additional benefit provided from using counterrotated camera orientations, as is the case in the process 400, is the mitigation of sampling artifacts (e.g., jagged lines) in the displayed images. To explain, the application 407 may, in the process of rendering a frame including images 409(1) and 409(2), perform various sampling steps itself, such as super-sampling, antialiasing (e.g., resolving the multisample antialiasing (MSAA) buffer from 16 samples (4×4) per pixel to 1 sample per pixel), etc. These sampling steps in the application 407 introduce sampling artifacts that tend to align themselves on the verticals and horizontals of the frame. In addition, because the compositor 403 typically has somewhere between 8 to 11 ms to resample the frame received from the application 407, fast filters (e.g., box filters, linear filters, etc.) are used to speed up the resampling operations. These types of filters often have axis-aligned properties that cause sampling artifacts to manifest in in resampled frame that are also axis aligned (in the verticals and horizontals of the frame). Because vertically-aligned objects and horizontally-aligned objects are typically ubiquitous in virtual reality environments, the resulting images, when upright camera orientations are used for the virtual cameras, often include many sampling artifacts along the verticals and horizontals of the image, such as jagged horizontal lines and jagged vertical lines that look like "stair steps" in the displayed image. This can be quite visually distracting to the viewing user, especially when these jagged lines come in-and-out of view. By contrast, lines that run diagonally across the image often look smooth, with no discernable jagged appearance. By specifying counterrotated camera orientations in the camera pose data 405 that is provided to the application 407 for rendering a frame, as described in the process 400, for example, these sampling artifacts are mitigated because the they end up at non-vertical and non-horizontal angles in the final images, making the objects in the images more aesthetically-pleasing to look at.

Figure 5:
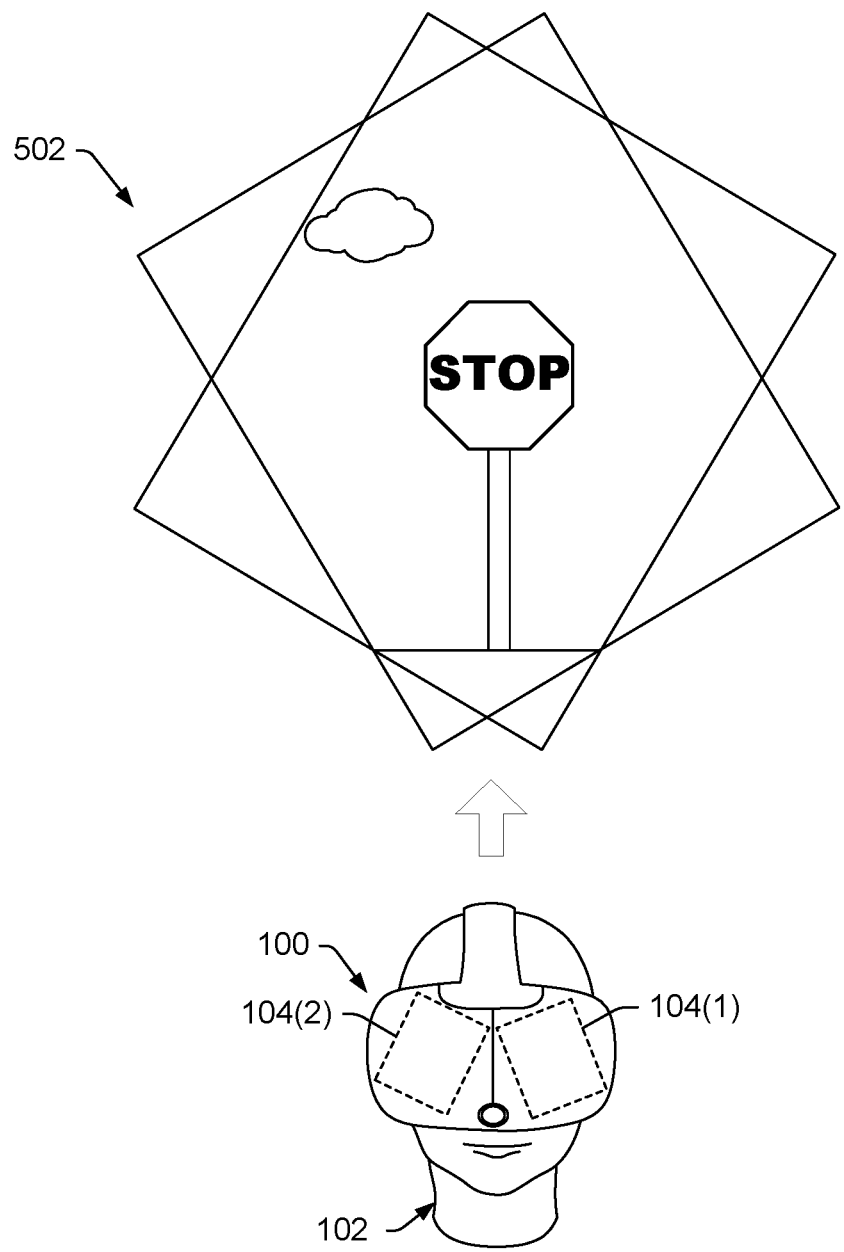
FIG. 5 is a diagram illustrating displayed images, as seen from the perspective of a viewing user through the lenses of the HMD, in accordance with embodiments disclosed herein.

FIG. 5 is a diagram illustrating a view 502 of displayed images, as seen from the perspective of a viewing user 102 through the lenses 108 of the HMD 100, in accordance with embodiments disclosed herein. The user 102 reaps the benefits described herein, many of which relate to improved display performance (e.g., mitigated panel artifacts, mitigated sampling artifacts, increased FOV, etc.), without being able to tell that the display panels 104 are not in an upright panel orientation 200.

Figure 6:
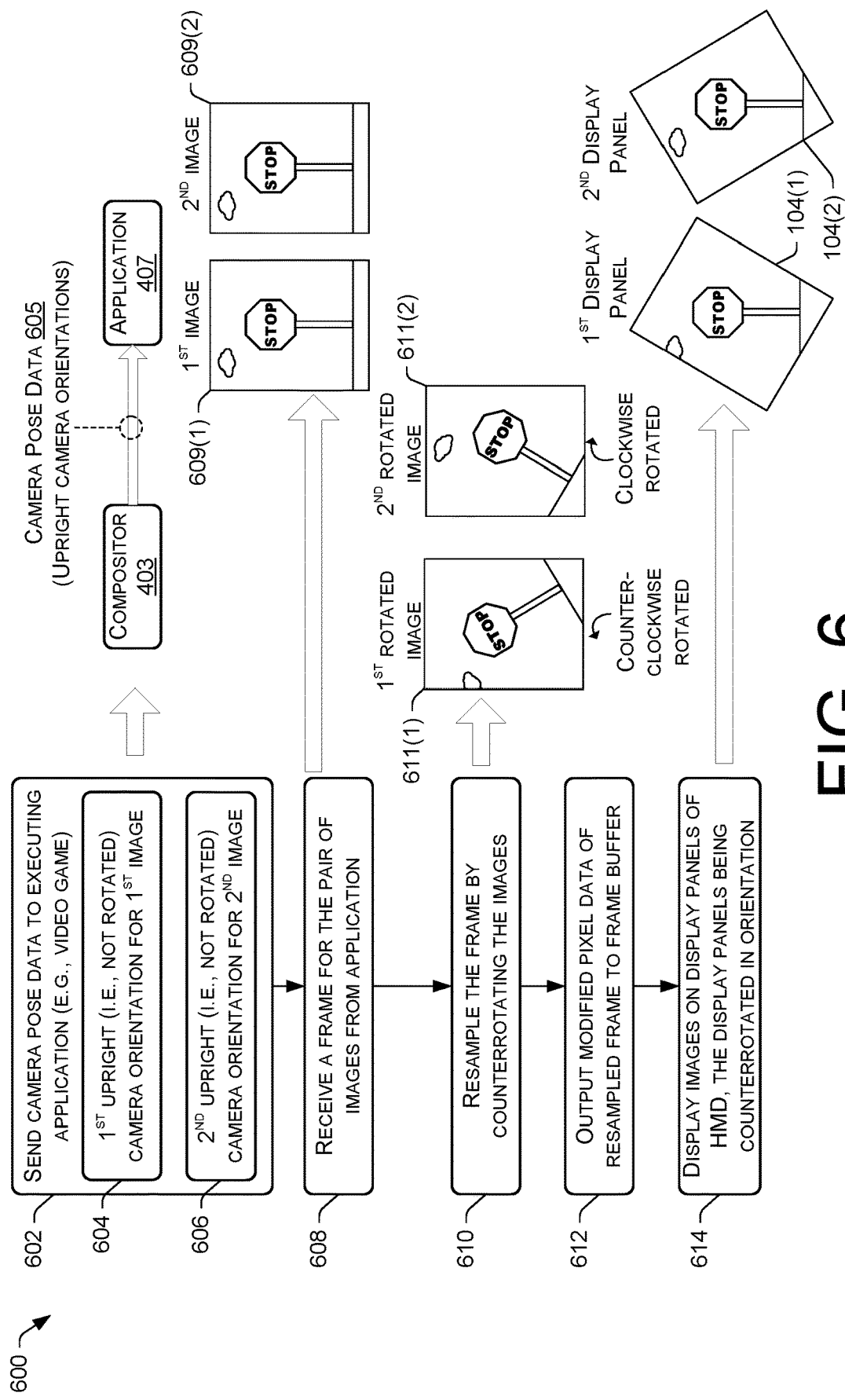
FIG. 6 is a flow diagram of an example process for sending camera pose data with upright camera orientations to an executing application, resampling a frame output by the application with rotational adjustments in the clockwise/counterclockwise directions, and outputting pixel data for the resampled frame to a frame buffer for display on counterrotated display panels.

FIG. 6 is a flow diagram of an example process 600 for sending camera pose data with upright camera orientations to an executing application, resampling a frame output by the application with rotational adjustments in the clockwise/counterclockwise directions, and outputting pixel data for the resampled frame to a frame buffer for display on counterrotated display panels. For discussion purposes, the process 600 is described with reference to the previous figures.

At 602, the compositor 403 of the HMD 100 (or HMD system) may send camera pose data 605 to an executing application 407 that is configured to output a frame of pixel data. A first subset of this pixel data is associated with the first display panel 104(1), a first image, a first virtual camera, and/or a first eye of the user wearing the HMD 100, while a second subset of this pixel data is associated with the second display panel 104(2), a second image, a second virtual camera, and/or a second eye of the user wearing the HMD 100. The camera pose data 605 informs the application 407 regarding how to render a next frame, in a series of frames, in accordance with the camera pose data 605. The operation(s) at block 602 may be performed as part of an API call. In some embodiments, the compositor 403 may further request the application 407 to render additional pixels to those that it would typically ask the application 407 to render if the display panels were upright-oriented. This is because the images of the frame will be counterrotated in the resampling operation(s) at block 610, below, and the additional pixels can be used to fill in the gaps that result from rotating the images in orientation during resampling.

As shown by sub-block 604, the camera pose data 605 may include a first upright camera orientation associated with a first image for the frame that is to be rendered on the first display panel 104(1), and this first upright camera orientation specifies (or indicates) that a first virtual camera, of the pair of virtual cameras, is in an upright camera orientation. The first upright camera orientation may further specify (or indicate) that the first virtual camera is canted, if the first display panel 104(1) happens to be canted in orientation, as described herein As shown by sub-block 606, the camera pose data 605 may further include a second upright camera orientation associated with a second image for the frame that is to be rendered on the second display panel 104(2), and this second upright camera orientation specifies (or indicates) that a second virtual camera, of the pair of virtual cameras, is in the upright camera orientation. The second upright camera orientation may further specify (or indicate) that the second virtual camera is canted, if the second display panel 104(2) happens to be canted in orientation, as described herein.

At 608, the compositor 403 may receive, from the application 407, a frame that includes a first image 609(1) (e.g., a left image) and a second image 609(2) (e.g., a right image).

It is to be appreciated that these images 609(1) and 609(2) (collectively 609) may be received, from the application 407 and by the compositor 403, as pixel data. Moreover, as shown in FIG. 6, the pair of images 609 have been rendered by the application 407 in accordance with the camera pose data 605, which included upright camera orientations. As such, the scenes in the pair of images 609 are upright, and are not rotated, as was the case in the process 400.

At 610, the compositor 403 may resample the frame by counterrotating the images 609 of the frame. For example, the compositor 403 may resample the frame by rotating a first subset of pixel data of the frame associated with the first virtual camera in a first direction (e.g., a counterclockwise direction) to obtain a first subset of modified pixel data of a resampled frame that corresponds to a first rotated image 611(1), and by rotating a second subset of the pixel data of the frame associated with the second virtual camera in a second direction (e.g., a clockwise direction) opposite the first direction to obtain a second subset of the modified pixel data of the resampled frame that corresponds to a second rotated image 611(2). These rotational adjustments may utilize an X-Y mapping of the pixels, and may perform mathematical calculations to move each pixel from a starting coordinate (X1,Y1) to a target coordinate (X2,Y2). The resampling operation(s) at block 610 may include additional digital transformations such as, without limitation, a correction for lens distortion (e.g., chromatic distortion), applying re-projection transforms to modify the pixel data in accordance with a predicted head pose of the user 102, etc.

At 612, the compositor 403 may output the modified pixel data associated with the resampled frame to a frame buffer so that the resampled frame can be output as a pair of images on the counterrotated display panels 104(1) and 104(2) of the HMD 100.

At 614, the pair of rotated images 611 of the resampled frame may be displayed on the counterrotated display panels 104(1) and 104(2) of the HMD 100. As shown in FIG. 6, the images presented on the display panels 104 are in an upright orientation despite the counterrotated orientation of the display panels 104. This is due to the rotational adjustments in the resampling operation(s) at block 610 that compensate for the counterrotated camera orientations that are provided in the camera pose data 605 to the application 407. It is to be appreciated that the process 600 involves rendering a single frame, and that the process 600 may iterate to render multiple sequential frames during execution of the application 407. Although the sampling artifacts described herein may manifest themselves in the images displayed in the embodiment of FIG. 6, the counterrotated orientation of the display panels 104 provides the remaining benefits described herein, such as mitigation of panel artifacts, increased FOV, and improved ergonomics.

Figure 7:
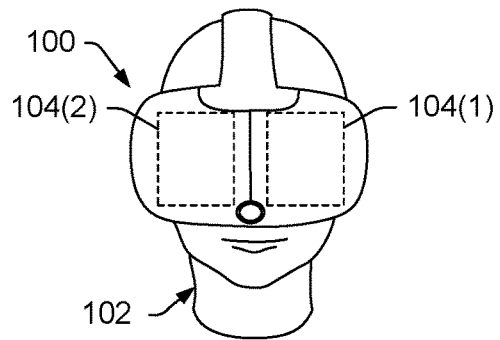
FIG. 7 is a diagram illustrating a front view of a pair of display panels in upright panel orientations, a top view of the pair of the display panels in the upright panel orientations, and an additional top view of the pair of display panels after canting the display panels.
Figure 7:
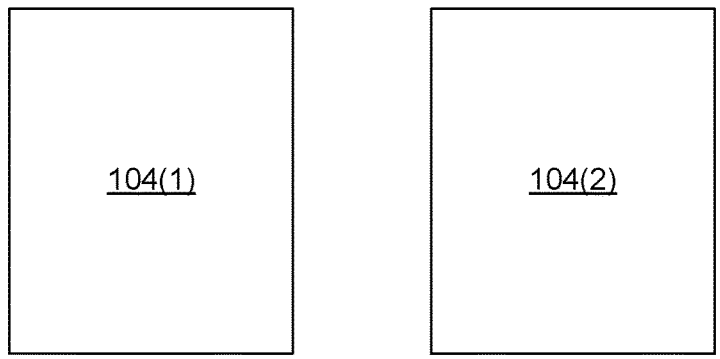
Figure 7:
Figure 7:

FIG. 7 is a diagram illustrating a front view 700 of a pair of display panels 104(1) and 104(2) in upright panel orientations 200, as well as a top view 702 of the pair of the display panels 104(1) and 104(2) in the upright panel orientations 200, and an additional top view 704 of the pair of display panels 104(1) and 104(2) after canting the display panels. The orientations of the display panels 104(1) and 104(2) in FIG. 7 is presented in the context of the embodiment described in FIG. 8, below. That is to say, the display panels 104 are not counterrotated in this embodiment, and are, instead oriented in the upright panel orientation 200. In some embodiments, the display panels 104 may be canted, such as by canting each display panel 104 about an axis (e.g., the Y-axis) that is orthogonal to the transverse plane of the upright panel orientation 200. For example, the first display panel 104(1) can be canted in a first direction (e.g., a counterclockwise direction) about the orthogonal axis to the transverse plane, and the second display panel 104(2) can be canted in a second direction (e.g., a clockwise direction) opposite the first direction about the orthogonal axis to the transverse plane. In addition, or alternatively, the display panels 104 may be canted about a second axis (e.g., the X-axis) that is orthogonal to the midsagittal plane of the upright panel orientation 200.

Figure 8:
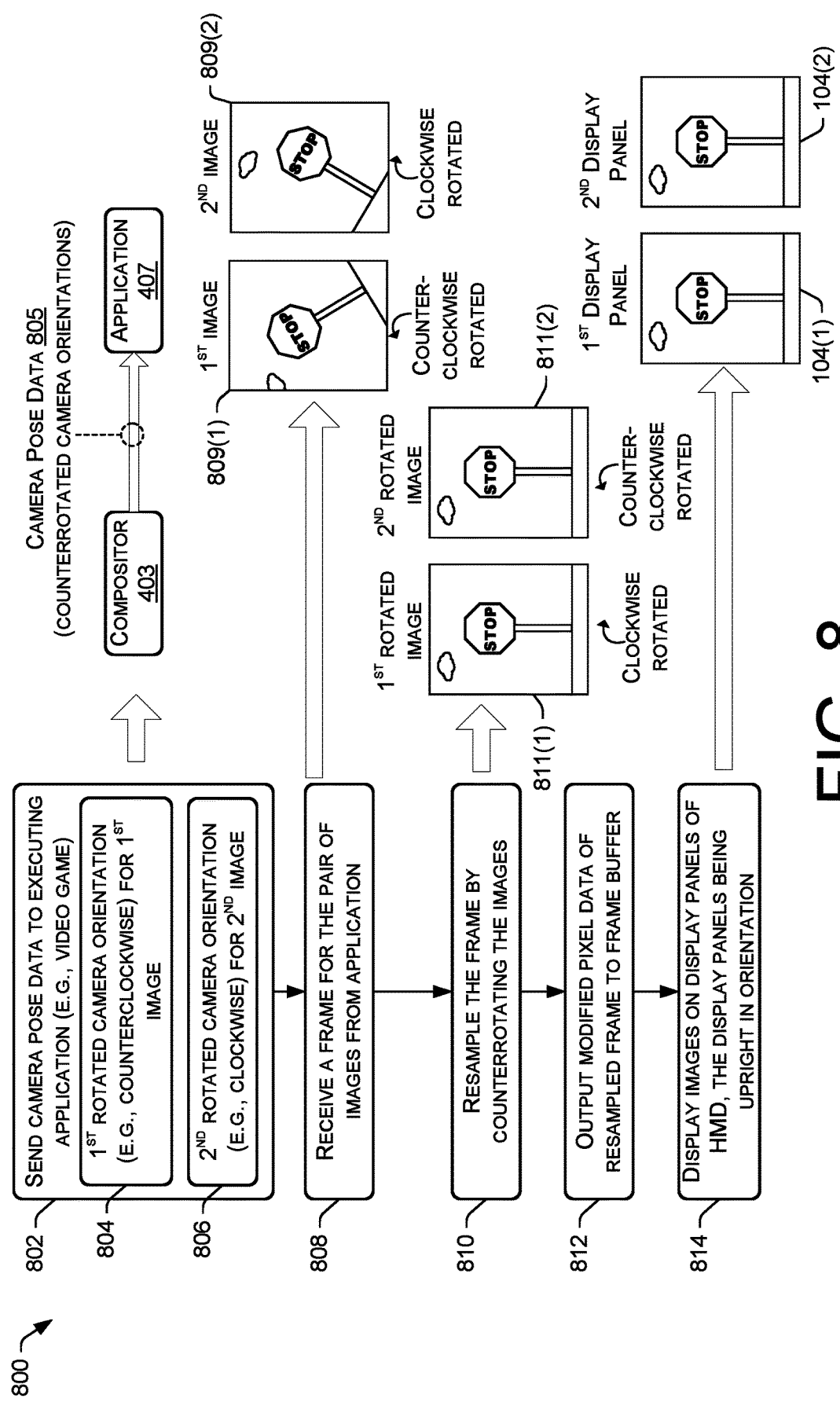
FIG. 8 is a flow diagram of an example process for sending camera pose data with counterrotated camera orientations to an executing application, resampling a frame output by the application with rotational adjustments in the clockwise/counterclockwise directions, and outputting pixel data for the resampled frame to a frame buffer for display on upright-oriented display panels.

FIG. 8 is a flow diagram of an example process 800 for sending camera pose data with counterrotated camera orientations to an executing application, resampling a frame output by the application with rotational adjustments in the clockwise/counterclockwise directions, and outputting pixel data for the resampled frame to a frame buffer for display on upright-oriented display panels, such as the display panels shown in FIG. 7. For discussion purposes, the process 800 is described with reference to the previous figures.

At 802, the compositor 403 of the HMD 100 (or HMD system) may send camera pose data 805 to an executing application 407 that is configured to output a frame of pixel data. A first subset of this pixel data is associated with the first display panel 104(1), a first image, a first virtual camera, and/or a first eye of the user wearing the HMD 100, while a second subset of this pixel data is associated with the second display panel 104(2), a second image, a second virtual camera, and/or a second eye of the user wearing the HMD 100. The camera pose data 805 informs the application 407 regarding how to render a next frame, in a series of frames, in accordance with the camera pose data 805. The operation(s) at block 802 may be performed as part of an API call. In some embodiments, the compositor 403 may further request the application 407 to render additional pixels to those that it would typically ask the application 407 to render if the compositor 403 were to send upright camera orientations in the camera pose data 805. This is because the images of the frame will be counterrotated in the resampling operation(s) at block 810, below, in order to counteract the counterrotated camera orientations in the camera pose data 805, and the additional pixels can be used to fill in the gaps that result from rotating the images in orientation during resampling.

As shown by sub-block 804, the camera pose data 805 may include a first rotated camera orientation associated with a first image for the frame that is to be rendered on the first display panel 104(1), and this first rotated camera orientation specifies (or indicates) that a first virtual camera, of the pair of virtual cameras, is rotated, relative to an upright camera orientation, in a first direction (e.g., a counterclockwise direction). The amount of rotation specified in the first rotated camera orientation may be within a range of 10 to 80 degrees, within a range of 20 to 70 degrees, within a range of 30 to 60 degrees, or within a range of 40 to 50 degrees, relative to the upright camera orientation. A 45-degree rotation may provide the greatest mitigation of sampling artifacts. The first rotated camera orientation may further specify (or indicate) that the first virtual camera is canted, if the first display panel 104(1) happens to be canted in orientation, as described herein.

As shown by sub-block 806, the camera pose data 805 may further include a second rotated camera orientation associated with a second image for the frame that is to be rendered on the second display panel 104(2), and this second rotated camera orientation specifies (or indicates) that a second virtual camera, of the pair of virtual cameras, is rotated, relative to the upright camera orientation, in a second direction (e.g., a clockwise direction) opposite the first direction. The amount of rotation specified in the second rotated camera orientation may be substantially equal to the amount of rotation specified in the first rotated camera orientation, and may be within the ranges of rotation specified with reference to sub-block 804. The second rotated camera orientation may further specify (or indicate) that the second virtual camera is canted, if the second display panel 104(2) happens to be canted in orientation, as described herein.

At 808, the compositor 403 may receive, from the application 407, a frame that includes a first image 809(1) (e.g., a left image) and a second image 809(2) (e.g., a right image). It is to be appreciated that these images 809(1) and 809(2) (collectively 809) may be received, from the application 407 and by the compositor 403, as pixel data. Moreover, as shown in FIG. 8, the pair of images 809 have been rendered by the application 407 in accordance with the camera pose data 805, which included the counterrotated camera orientations. As such, the scenes in the pair of images 809 are counterrotated by a corresponding amount of rotation, based on the counterrotated camera orientations. Said another way, the application 407 natively renders the counterrotated camera orientations of the virtual cameras.

At 810, the compositor 403 may resample the frames by counterrotating the images 809 of the frame. For example, the compositor 403 may resample the frame by rotating a first subset of pixel data of the frame associated with the first virtual camera in a first direction (e.g., a clockwise direction) to obtain a first subset of modified pixel data of a resampled frame that corresponds to a first rotated image 811(1), and by rotating a second subset of the pixel data of the frame associated with the second virtual camera in a second direction (e.g., a counterclockwise direction) opposite the first direction to obtain a second subset of the modified pixel data of the resampled frame that corresponds to a second rotated image 811(2). The amount of rotation that the second subset of the pixel data is rotated may be substantially equal to the amount of rotation that the first subset of the pixel data is rotated, and may be within the ranges of rotation specified with reference to sub-block 804. The resampling operation(s) at block 810 may include additional digital transformations such as, without limitation, a correction for lens distortion (e.g., chromatic distortion), applying reprojection transforms to modify the pixel data in accordance with a predicted head pose of the user 102, etc.

At 812, the compositor 403 may output the modified pixel data associated with the resampled frame to a frame buffer so that the resampled frame can be output as a pair of images on the upright-oriented display panels 104(1) and 104(2) of the HMD 100, such as those shown in FIG. 7.

At 814, the pair of rotated images 811 may be displayed on the upright-oriented display panels 104(1) and 104(2) of the HMD 100. As shown in FIG. 8, the images presented on the display panels 104 are in an upright orientation. This is due to the rotational adjustments in the resampling operation(s) at block 810 that compensate for the counterrotated camera orientations that are provided in the camera pose data 805 to the application 407. It is to be appreciated that the process 800 involves rendering a single frame, and that the process 800 may iterate to render multiple sequential frames during execution of the application 407. The process 800, despite its use in a HMD 100 having upright-oriented display panels 104, mitigates the sampling artifacts (e.g., jagged lines) described herein to improve the display performance of the HMD 100.

Figure 9:
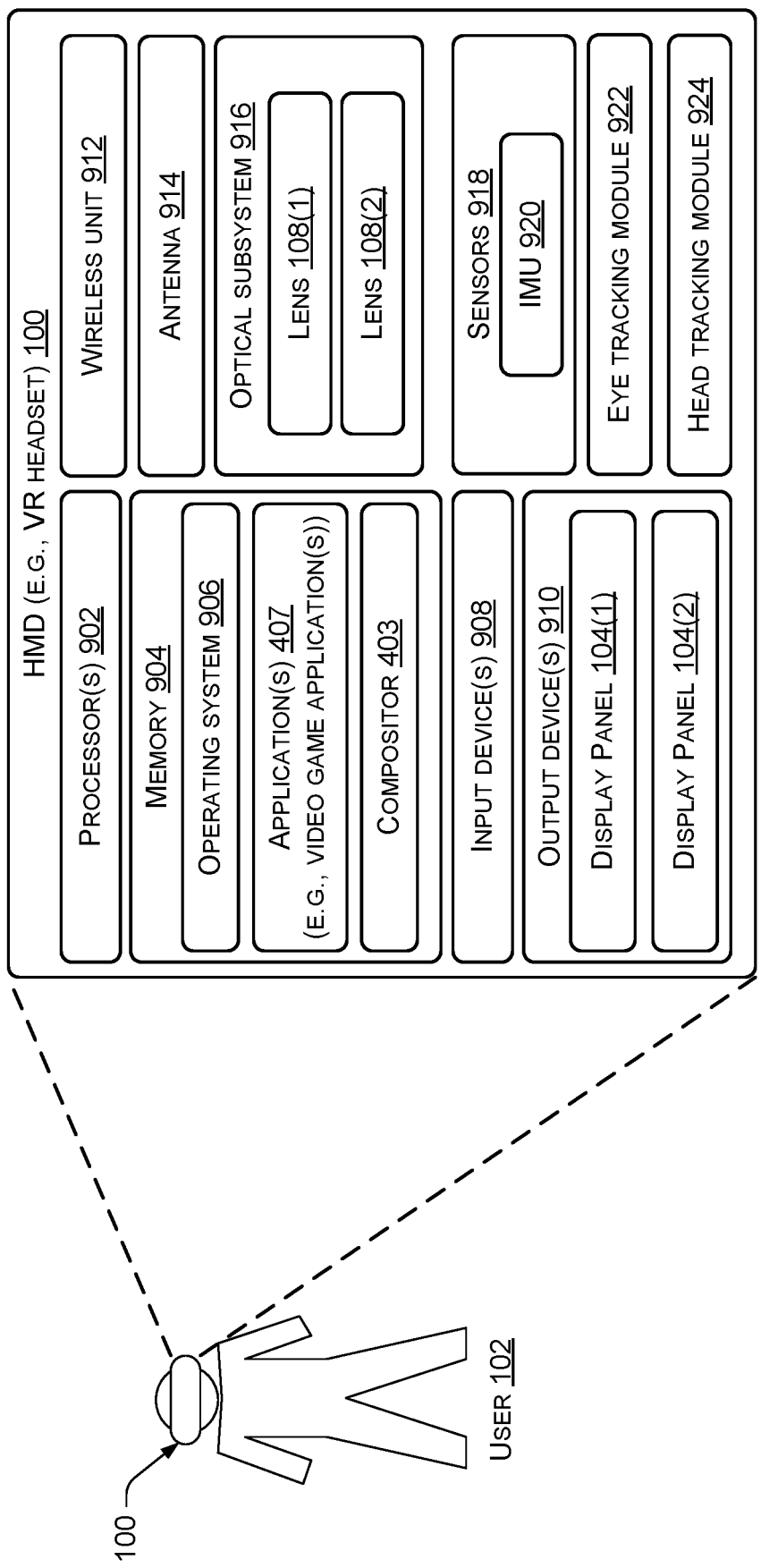
FIG. 9 illustrates example components of a HMD, such as a VR headset, in which the techniques disclosed herein can be implemented.

FIG. 9 illustrates example components of a HMD 100 (or a HMD system that includes the HMD 100), such as a VR headset, according to the embodiments disclosed herein may be embedded. The HMD 100 may be implemented as a standalone device that is to be worn by a user 102 (e.g., on a head of the user 102). In some embodiments, the HMD 100 may be head-mountable, such as by allowing a user 102 to secure the HMD 100 on his/her head using a securing mechanism (e.g., an adjustable band) that is sized to fit around a head of a user 102. In some embodiments, the HMD 100 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 100 of FIG. 1. However, it is to be appreciated that these types of devices are merely example of a HMD 100, and it is to be appreciated that the HMD 100 may be implemented in a variety of other form factors. It is also to be appreciated that some or all of the components shown in FIG. 9 may be implemented on the HMD 100. Accordingly, in some embodiments, a subset of the components shown in FIG. 9 may be implemented on a computing device that is part of the HMD system, but is separate from the HMD 100 itself, such as a PC, a game console, or any other suitable computing device.

In the illustrated implementation, the HMD 100 includes one or more processors 902 and memory 904 (e.g., computer-readable media 904). In some implementations, the processors(s) 902 may include a central processing unit (CPU)(s), a graphics processing unit (GPU)(s), both CPU(s) and GPU(s), a microprocessor(s), a digital signal processor(s) or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 902 may possess its own local memory, which also may store program modules, program data, and/or one or more operating systems.

The memory 904 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 904 may be implemented as computer-readable storage media ("CRSM"), which may be any available physical media accessible by the processor(s) 902 to execute instructions stored on the memory 904. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 902.

In general, the HMD 100 may include logic (e.g., software, hardware, and/or firmware, etc.) that is configured to implement the techniques, functionality, and/or operations described herein. The computer-readable media 904 is shown as including various modules, such as instruction, datastores, and so forth, which may be configured to execute on the processor(s) 902 for carrying out the techniques, functionality, and/or operations described herein. A few example functional modules are shown as stored in the computer-readable media 904 and executable on the processor(s) 902, although the same functionality may alternatively be implemented in hardware, firmware, or as a system on a chip (SOC), and/or other logic.

An operating system module 906 may be configured to manage hardware within and coupled to the HMD 100 for the benefit of other modules. In addition, in some instances the HMD 100 may include one or more applications 407 stored in the memory 904 or otherwise accessible to the HMD 100. In this implementation, the application(s) 407 includes a video game application(s) 407. However, the HMD 100 may include any number or type of applications and is not limited to the specific example shown here. The video game application(s) 407 may be configured to initiate gameplay of a video-based, interactive game (e.g., a VR game) that is playable by the user 102, and to output frames to be rendered on the display panels 104 of the HMD 100. A compositor 403, in combination with other logic of the HMD 100, may be configured to perform the techniques described herein to provide camera pose data 405/605/805 to the application 407, resample frames, and output pixel data for the resampled frames to a frame buffer.

Generally, the HMD 100 has input devices 908 and output devices 910. The input devices 908 may include control buttons. In some implementations, one or more microphones may function as input devices 908 to receive audio input, such as user voice input. In some implementations, one or more cameras or other types of sensors (e.g., inertial measurement unit (IMU)) may function as input devices 908 to receive gestural input, such as a hand and/or head motion of the user 102. In some embodiments, additional input devices 908 may be provided in the form of a keyboard, keypad, mouse, touch screen, joystick, and the like. In other embodiments, the HMD 100 may omit a keyboard, keypad, or other similar forms of mechanical input. Instead, the HMD 100 may be implemented relatively simplistic forms of input device 908, a network interface (wireless or wire-based), power, and processing/memory capabilities. For example, a limited set of one or more input components may be employed (e.g., a dedicated button to initiate a configuration, power on/off, etc.) so that the HMD 100 can thereafter be used. In one implementation, the input device(s) 908 may include control mechanisms, such as basic volume control button(s) for increasing/decreasing volume, as well as power and reset buttons.

The output devices 910 may include the pair of display panels 104(1) and 104(2). The output devices 910 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 100 may further include a wireless unit 912 coupled to an antenna 914 to facilitate a wireless connection to a network. The wireless unit 912 may implement one or more of various wireless technologies, such as Wi-Fi, Bluetooth, radio frequency (RF), and so on. It is to be appreciated that the HMD 100 may further include physical ports to facilitate a wired connection to a network, a connected peripheral device (including a PC, game console, etc.), or a plug-in network device that communicates with other wireless networks, and which may be part of the HMD system.

The HMD 100 may further include optical subsystem 916 that directs light from the display panels 104 to a user's eyes using one or more optical elements. The optical subsystem 916 may include various types and combinations of different optical elements, including, without limitations, such as apertures, lenses (e.g., Fresnel lenses, convex lenses, concave lenses, etc.), filters, and so forth. Each of the lenses 108(1) and 108(2) may include some or all of these optical elements. In some embodiments, one or more optical elements in optical subsystem 916 may have one or more coatings, such as anti-reflective coatings. Magnification of the image light by optical subsystem 916 allows display panels 104 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. Coupled with the counterrotated orientation of the display panels 104(1) and 104(2), this FOV may be increased in the horizontal even further. AR applications may have a narrower FOV (e.g., about 40 degrees FOV). Optical subsystem 916 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to the display panels 104 for display is pre-distorted, and optical subsystem 916 corrects the distortion when it receives image light from display panels 104 generated based on the content. In some embodiments, the compositor 403 is configured to resample frames in the rendering pipeline to correct for distortion, as described above.

The HMD 100 may further include one or more sensors 918, such as sensors used to generate motion, position, and orientation data. These sensors 918 may be or include gyroscopes, accelerometers, magnetometers, video cameras, color sensors, or other motion, position, and orientation sensors. The sensors 918 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 100 may include light sensors that are sensitive to light (e.g., infrared or visible light) that is projected or broadcast by base stations in the environment of the HMD 100 in order to generate motion, position, and orientation data.

In an example, the sensor(s) 918 may include an inertial measurement unit (IMU) 920. IMU 920 may be an electronic device that generates calibration data based on measurement signals received from accelerometers, gyroscopes, magnetometers, and/or other sensors suitable for detecting motion, correcting error associated with IMU 920, or some combination thereof. Based on the measurement signals such motion-based sensors, such as the IMU 920, may generate calibration data indicating an estimated position of HMD 100 relative to an initial position of HMD 100. For example, multiple accelerometers may measure translational motion (forward/back, up/down, left/right) and multiple gyroscopes may measure rotational motion (e.g., pitch, yaw, and roll). IMU 920 can, for example, rapidly sample the measurement signals and calculate the estimated position of HMD 100 from the sampled data. For example, IMU 920 may integrate measurement signals received from the accelerometers over time to estimate a velocity vector and integrates the velocity vector over time to determine an estimated position of a reference point on HMD 100. The reference point is a point that may be used to describe the position of the HMD 100. While the reference point may generally be defined as a point in space, in various embodiments, reference point is defined as a point within HMD 100 (e.g., a center of the IMU 920). Alternatively, IMU 920 provides the sampled measurement signals to an external console (or other computing device), which determines the calibration data.

The sensors 918 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 918 may include light sensors that are sensitive to light emitted by base stations in the environment of the HMD 100 for purposes of tracking position and/or orientation, pose, etc., of the HMD 100 in 3D space. The calculation of position and/or orientation may be based on timing characteristics of light pulses and the presence or absence of light detected by the sensors 918.

The HMD 100 may further include an eye tracking module 922. A camera or other optical sensor inside HMD 100 may capture image information of a user's eyes, and eye tracking module 922 may use the captured information to determine interpupillary distance, interocular distance, a three-dimensional (3D) position of each eye relative to HMD 100 (e.g., for distortion adjustment purposes), including a magnitude of torsion and rotation (i.e., roll, pitch, and yaw) and gaze directions for each eye. In one example, infrared light is emitted within HMD 100 and reflected from each eye. The reflected light is received or detected by a camera of the HMD 100 and analyzed to extract eye rotation from changes in the infrared light reflected by each eye. Many methods for tracking the eyes of a user 102 can be used by eye tracking module 922. Accordingly, eye tracking module 922 may track up to six degrees of freedom of each eye (i.e., 3D position, roll, pitch, and yaw) and at least a subset of the tracked quantities may be combined from two eyes of a user 102 to estimate a gaze point (i.e., a 3D location or position in the virtual scene where the user is looking). For example, eye tracking module 922 may integrate information from past measurements, measurements identifying a position of a user's 102 head, and 3D information describing a scene presented by display panels 104. Thus, information for the position and orientation of the user's 102 eyes is used to determine the gaze point in a virtual scene presented by HMD 100 where the user 102 is looking.

The HMD 100 may further include a head tracking module 924. The head tracking module 924 may leverage one or more of the sensor 918 to track head motion, including head rotation, of the user 102, as described above. For example, the head tracking module 924 can track up to six degrees of freedom of the HMD 100 (i.e., 3D position, roll, pitch, and yaw). These calculations can be made at every frame (or frame pair) of a series of frames (or frame pairs) so that the application 407 can determine how to render a scene in the next frame in accordance with the head position and orientation. In some embodiments, the head tracking module 924, and/or the compositor 403 using the head tracking module 924, is configured to predict a future position and/or orientation of the HMD 100 based on current and/or past data. This is because the application 407 is asked to render a frame (or frame pair) before the user 102 actually sees the light (and, hence, the image) on the display panels 104. Accordingly, a next frame (or frame pair) can be rendered based on this future prediction of head position and/or orientation that was made at an earlier point in time, such as roughly 25-30 milliseconds (ms) prior to rendering the frame (or frame pair). Rotation data provided by the head tracking module 924 can be used to determine both direction of HMD 100 rotation, and amount of HMD 100 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 100.

Unless otherwise indicated, all numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) system comprising:
   a HMD including a pair of display panels;
   one or more processors; and
   memory storing computer-executable instructions that, when executed by the one or more processors, cause the one or more processors to:

send, to an application that is configured to output a frame, camera pose data that includes counterrotated camera orientations comprising:
  a first rotated camera orientation that is rotated, relative to an upright camera orientation, in a first direction; and
  a second rotated camera orientation that is rotated, relative to the upright camera orientation, in a second direction opposite the first direction;
receive the frame from the application, wherein the frame includes pixel data representing a pair of images with scenes that are counterrotated based on the counterrotated camera orientations;
resample the frame to obtain a resampled frame with the scenes oriented upright by:
  rotating a first subset of the pixel data associated with the first rotated camera orientation in the second direction to obtain a first subset of modified pixel data of the resampled frame; and
  rotating a second subset of the pixel data associated with the second rotated camera orientation in the first direction to obtain a second subset of the modified pixel data of the resampled frame; and
output the modified pixel data to a frame buffer.

2. The HMD system of claim 1, wherein:
the first direction is a counterclockwise direction; and
the second direction is a clockwise direction.

3. The HMD system of claim 1, wherein the computer-executable instructions, when executed by the one or more processors, further cause the one or more processors to display, based at least in part on the modified pixel data of the resampled frame, the pair of images on the pair of display panels with the scenes oriented upright.

4. The HMD system of claim 1, wherein:
a first display panel of the pair of display panels is canted about an axis that is orthogonal to a transverse plane of an upright panel orientation;
a second display panel of the pair of display panels is canted, in a direction opposite to that of the first display panel, about the axis that is orthogonal to the transverse plane of the upright panel orientation; and
the camera pose data further includes canted camera orientations.

5. The HMD system of claim 1, wherein resampling the frame comprises rotating each of the first subset of the pixel data and the second subset of the pixel data by a substantially equal amount of rotation.

6. The HMD system of claim 5, wherein the substantially equal amount of rotation is within a range of 40 to 50 degrees relative to the upright camera orientation.

7. The HMD system of claim 1, wherein:
the first rotated camera orientation is rotated in the first direction by a first amount of rotation;
the second rotated camera orientation is rotated in the second direction by a second amount of rotation; and
resampling the frame comprises:
  rotating the first subset of the pixel data in the second direction by the first amount of rotation; and
  rotating the second subset of the pixel data in the first direction by the second amount of rotation.

8. The HMD system of claim 7, wherein the first amount of rotation is substantially equal to the second amount of rotation.

9. A method comprising:
sending, by one or more processors, to an application that is configured to output a frame, camera pose data that includes counterrotated camera orientations comprising:
  a first rotated camera orientation that is rotated, relative to an upright camera orientation, in a first direction; and
  a second rotated camera orientation that is rotated, relative to the upright camera orientation, in a second direction opposite the first direction;
receiving, by the one or more processors, from the application, pixel data of the frame, the pixel data representing a pair of images with scenes that are counterrotated based on the counterrotated camera orientations;
resampling, by the one or more processors, the frame to obtain a resampled frame with the scenes oriented upright by:
  rotating a first subset of the pixel data associated with the first rotated camera orientation in the second direction to obtain a first subset of modified pixel data of the resampled frame; and
  rotating a second subset of the pixel data associated with the second rotated camera orientation in the first direction to obtain a second subset of the modified pixel data of the resampled frame; and
outputting the modified pixel data to a frame buffer of a head-mounted display (HMD).

10. The method of claim 9, wherein:
the first direction is a counterclockwise direction; and
the second direction is a clockwise direction.

11. The method of claim 9, further comprising displaying, based at least in part on the modified pixel data of the resampled frame, the pair of images on a pair of display panels of the HMD.

12. The method of claim 11, wherein each display panel of the pair of display panels is orientated in an upright panel orientation within a housing of the HMD.

13. The method of claim 12, wherein:
a first display panel of the pair of display panels is canted about an axis that is orthogonal to a transverse plane of the upright panel orientation;
a second display panel of the pair of display panels is canted, in a direction opposite to that of the first display panel, about the axis that is orthogonal to the transverse plane of the upright panel orientation; and
the camera pose data further includes canted camera orientations.

14. The method of claim 9, wherein the resampling of the frame comprises rotating each of the first subset of the pixel data and the second subset of the pixel data by a substantially equal amount of rotation.

15. The method of claim 9, wherein the application is a video game application.

16. A head-mounted display (HMD) system comprising:
a HMD including a pair of display panels; and
logic configured to:
  send, to an application that is configured to output a frame, camera pose data that includes counterrotated camera orientations;
  receive the frame from the application, wherein the frame includes pixel data representing a pair of images with scenes that are counterrotated based on the counterrotated camera orientations;

rotate a first subset of the pixel data and a second subset of the pixel data in opposite directions to obtain modified pixel data of a resampled frame with the scenes oriented upright;

output the modified pixel data to a frame buffer; and display, based at least in part on the modified pixel data of the resampled frame, the pair of images on the pair of display panels.

17. The HMD system of claim 16, wherein:

the counterrotated camera orientations comprise:

a first rotated camera orientation that is rotated, relative to an upright camera orientation, in a counterclockwise direction; and a second rotated camera orientation that is rotated, relative to the upright camera orientation, in a clockwise direction;

the first subset of the pixel data is associated with the first rotated camera orientation and is rotated in the clockwise direction; and the second subset of the pixel data is associated with the second rotated camera orientation and is rotated in the counterclockwise direction.

18. The HMD system of claim 16, wherein each of the first subset of the pixel data and the second subset of the pixel data are rotated in the opposite directions by a substantially equal amount of rotation.

19. The HMD system of claim 16, wherein the pair of display panels are coplanar.

20. The HMD system of claim 16, wherein:

a first display panel of the pair of display panels is canted about an axis that is orthogonal to a transverse plane of an upright panel orientation;

a second display panel of the pair of display panels is canted, in a direction opposite to that of the first display panel, about the axis that is orthogonal to the transverse plane of the upright panel orientation; and the camera pose data further includes canted camera orientations.

\* \* \* \* \*